United States Patent [19]

Long et al.

[11] 3,993,472
[45] Nov. 23, 1976

[54] DESULFURIZATION OF IRON OXIDE PELLETS

[75] Inventors: Raymond H. Long, Morristown, N.J.; William V. Bauer, New York, N.Y.

[73] Assignee: The Lummus Company, Bloomfield, N.J.

[22] Filed: Aug. 19, 1974

[21] Appl. No.: 498,665

[52] U.S. Cl. .................................... 75/4; 75/6
[51] Int. Cl.² .................. C22B 1/24; C22B 1/11
[58] Field of Search ..................... 75/1, 3–5, 75/6

[56] References Cited
UNITED STATES PATENTS

| | | | |
|---|---|---|---|
| 1,923,803 | 8/1933 | Trent | 75/4 |
| 2,495,225 | 1/1950 | Buehl | 75/6 |
| 2,939,784 | 6/1960 | Brennan | 75/6 |
| 3,642,465 | 2/1972 | Sze | 75/4 |
| 3,748,116 | 7/1973 | Reed | 75/4 |

Primary Examiner—Peter D. Rosenberg
Attorney, Agent, or Firm—Marn and Jangarathis

[57] ABSTRACT

Iron oxide pellets, containing integral carbon and a desulfurizing additive, are heated up to a final reduction temperature of 1800° – 2500° F, with the heating over the range from 1500° F to the final reduction temperature being controlled depending on the amount of integral carbon in the pellets. The pellets are reduced, with the pellets being steamed prior to the reduction or during the reduction. Pellets having a sulfur content of less than 0.03 weight percent are produced.

26 Claims, 1 Drawing Figure

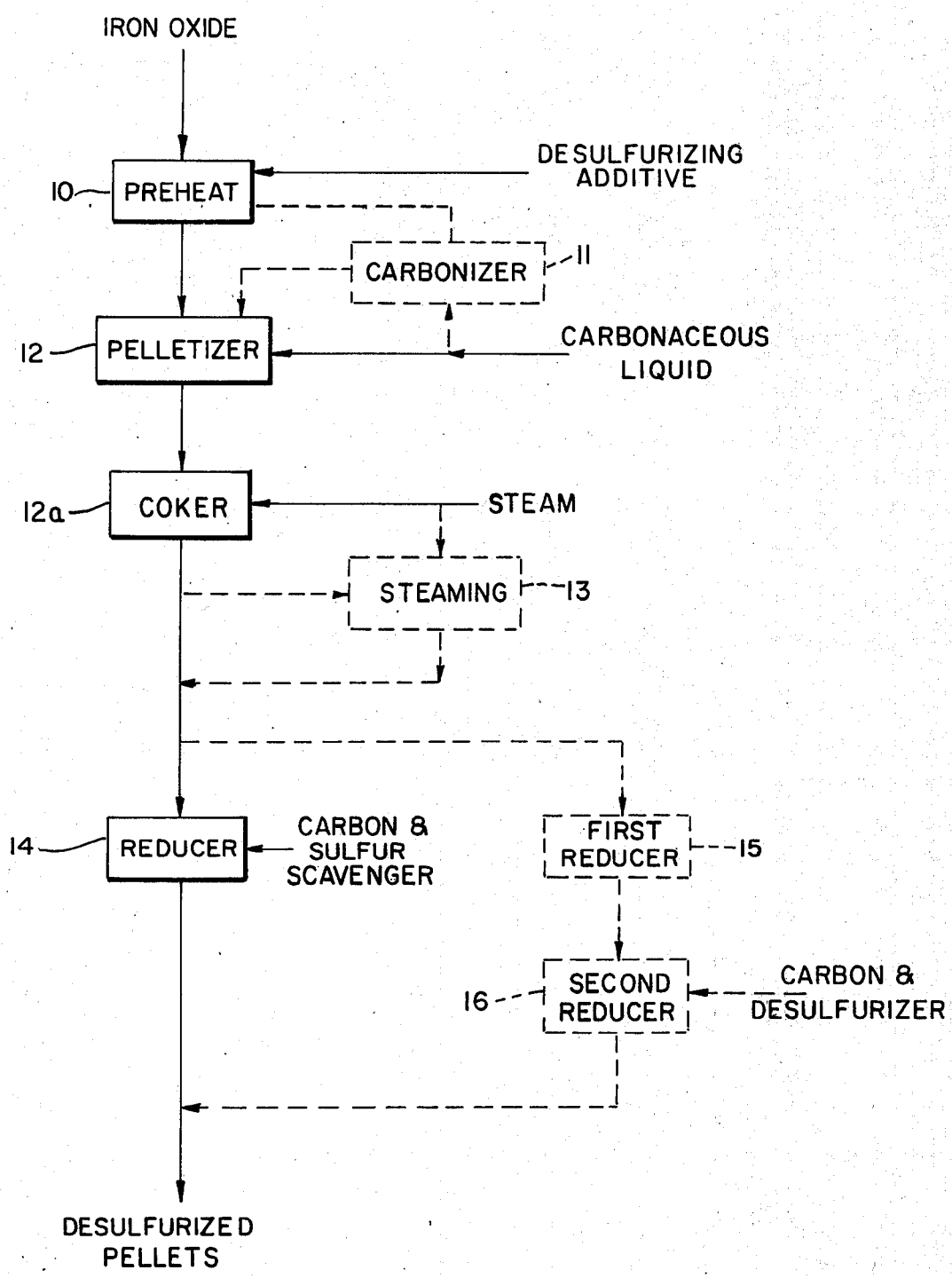

DESULFURIZATION OF IRON OXIDE PELLETS

This invention relates to the production of iron oxide pellets, and more particularly to the production of desulfurized iron oxide pellets.

In U.S. Pat. No. 3,642,465, there is disclosed a process for producing prereduced iron oxide pellets wherein at least a portion of the reduction carbon is provided from a liquid carbonaceous binder.

The prereduced iron oxide pellets, produced in this manner, as a result of the sulfur content of the liquid carbonaceous binder employed for providing integral carbon, may contain sulfur in a quantity in excess of that desired for certain applications. Thus, for example, in using highly prereduced pellets in an electric furnace, in general, the sulfur content should not exceed 0.03 weight percent.

Accordingly, there is a need for improved means for producing prereduced pellets, by use of integral carbon provided by a liquid carbonaceous binder, whereby the prereduced pellets will have a low sulfur content.

An object of the present invention is to provide prereduced iron oxide pellets of low sulfur content.

A further object of the present invention is to provide prereduced iron oxide pellets suitable for use in an electric furnace.

These and other objects of the present invention should be more readily apparent for the following description thereof.

In accordance with the present invention, prereduced iron oxide pellets having a low sulfur content are produced from an iron oxide pellet, including integral carbon and a sulfur scavenging compound, by heating the iron oxide pellets up to a final reduction temperature, with the time of heating from a temperature of 1500° F. to the final reduction temperature being controlled in accordance with the amount of integral carbon present in the pellets, followed by maintaining the pellets at the final reduction temperature to produce the prereduced pellets, with the pellets having been steamed prior to completion of the prereduction.

More particularly, the time period over which the pellets are heated from a temperature of 1500° F. up to a temperature within the range of final reduction temperatures is controlled in a manner such that iron oxide pellets containing integral carbon sufficient to provide no greater than 85 percent prereduction are rapidly heated through the temperature range from 1500° F. up to a final reduction temperature, and pellets containing integral carbon in an amount to provide greater than 85 percent prereduction are slowly heated through the temperature range from 1500° F. up to the final reduction temperature.

It is to be noted that while 85 percent pre-reduction is herein considered the change-over point from fast heating to slow heating, the advantages of the respective heating rates are most apparent at reduction levels below 85 percent and above 90 percent, respectively, and dsulfurization at reduction levels between these figures is not as dependent on heating rate.

The pellets are steamed prior to completion of the reduction, and such steaming, prior to completion of the reduction, can be effected either (1) during the coking which converts the carbonaceous binder to provide integral carbon for the pellets; (2) in a separate steaming step subsequent to the coking and prior to the reduction; or (3) during the reduction and/or heating up to the reduction temperature. It is to be understood that the recitation that the pellets are steamed prior to completion of the reduction, as used in the specification and claims, encompasses an operation where the pellets are steamed during or prior to the reduction.

The steaming of the iron oxide pellets can be effected by directly contacting the pellets with steam or by contacting the pellets with water, followed by heating of the pellets to a temperature at which the water contained in the pellets is vaporized to provide a steam containing atmosphere. Thus, for example, steam can be introduced into the coker in which the pellets containing the carbonaceous binder are coked to provide the integral carbon. The steam is preferably introduced below the operating level of the pellets to provide good contact between the steam and pellets.

As an alternative, the pellets, subsequent to the coking operation could be directly contacted with steam in a separate operation. As a further alternative, the coked pellets could be cooled and water added to the pellets by spraying water thereon, placing the pellets in a humid atmosphere, etc., followed by heating of the pellets to vaporize the water to effect steaming of the pellets.

As still another alternative, steam could be added to the reduction step or to the operation in which the pellets are heated up to the reduction temperature.

It is also to be understood that the steaming can be effected on wet pellets whereby the moisture present in the pellets provides additional steam. In some cases, such as when using high sulfur resids, improved results are obtained by steaming wet pellets.

The scope of the present invention is not limited to a specific manner of providing steam, provided the pellets are subjected to a steam atmosphere, during or subsequent to the coking to provide the integral carbon, and prior to completion of the reduction. Accordingly, the above methods and other methods for steaming the pellets are deemed to be within the scope of those skilled in the art from the teachings herein.

In accordance with the present invention, the pellets are steamed in a steam atmosphere sufficient to provide, when combined with the other processing expedients of the present invention, effective desulfurization of the iron oxide pellets, preferably to provide a prereduced pellet having a sulfur content of no greater than 0.03 percent, by weight. In general, the steaming is effected in a steam atmosphere (provided from water present in or on the pellets or by addition of steam) in which the steam partial pressure is at least 0.04 atmospheres (absolute), with the specific partial pressure being dependent upon the sulfur content of the carbonaceous material used in forming the integral carbon. The steam partial pressure employed for the steaming is generally from 0.04 to 1 atmosphere, and preferably from 0.10 to 0.92 atmosphere (absolute). It is to be understood that higher steam partial pressures could be used, but in general, no added beneficial effect is obtained from the use of such higher pressures. The selection of an optimum steam partial pressure which in combination with other processing expedients will provide desulfurization (generally to 0.03 percent or less) is deemed to be within the scope of those skilled in the art, from teachings herein, with higher steam partial pressures being employed when resids with higher sulfur contents are employed to provide the integral carbon.

The pellets are maintained in the steam atmosphere for a time sufficient to provide the desulfurization. In general, the pellets are maintained in the steam atmosphere for at least 0.25 hour, with the time period generally being from 0.25 hour to 1 hour. It is to be understood that longer time periods could be employed; however, as should be apparent, for economic reasons the shortest time period which provides desulfurization to 0.03 percent or less is employed. The selection of an optimum time period for effecting the desulfurization is also dependent upon sulfur content and steam partial pressure, and the selection of such a time period is deemed to be within the scope of those skilled in the art from the teachings herein.

The pellets, containing integral carbon, which are to be treated in accordance with the present invention are prepared by pelletizing the ore with a liquid carbonaceous binder, such as a residual oil, followed by coking of the green pellets to provide the integral carbon. The pelletizing is generally effected at a temperature from 350° to 800° F, preferably 400° to 750° F, in any of the well known pelletizers. The coking to produce integral carbon is generally effected at a temperature of from 900° to 1400° F, preferably from 1000° to 1300° F.

As an alternative, and less preferred procedure, a portion of the integral carbon may be provided by introducing the ore into the pelletizer in admixture with solid carbon. The solid carbon-ore mixture may be provided by introducing the ore and a carbonaceous material into a carbonizer, prior to the pelletizer, wherein the carbonaceous material is cracked thereby producing carbon on the oil particles.

The iron oxide pellets, which are reduced in accordance with the invention, contain in addition to integral carbon, a desulfurizing amount of a desulfurizing additive. The desulfurizing additive is generally either calcium chloride, magnesium chloride, ferrous chloride, ferric chloride or mixtures thereof or sodium chloride in combination with calcium oxide and/or carbonate. It is to be understood that other desulfurizing additives could be used in addition to those hereinabove described.

The desulfurizing additive is used in a desulfurizing amount, which is generally an amount from 0.01 percent to 5 percent, preferably from 0.5 to 3 percent, all in weight percent based on iron oxide ore. It is to be understood that greater amounts could be used and the selection of the particular desulfurizing additive and amount thereof, for a given case, to provide the desulfurized pellet is deemed to be within the scope of those skilled in the art from the teachings herein.

The desulfurizing additives may be incorporated in the pellets by feeding with the ore to the pelletizer or by suspension in finely divided form in the carbonaceous binder prior to spraying into the pelletizer or the carbonizer. Water soluble additives (viz.- the metal chlorides) may be conveniently sprayed into the ore prior to the ore drying and heat operation. The additives are uniformly dispersed in the pellet, with the particle size of the dispersed additives generally being at least under 100 mesh, and preferably 100 percent under 200 mesh.

The amount of carbon present and in contact with the pellet in the reduction kiln determines the degree of pre-reduction that will be achieved. In accordance with the present invention, this can be broken down into five categories or schemes, which are summarized hereinbelow in Table I. The first scheme relates to producing pellets of low pre-reduction, preferably 35–50 percent. Carbon for reduction is provided solely by the liquid binder material, without added carbon. The binder-to-solids ratio is chosen to provide good pelletizing operation and high pellet strength. Depending on the binder or, more accurately, its Conradson Carbon number, sufficient integral carbon will be laid down in the pellet for the desired reduction. Generally residual oils will provide enough carbon for 20–70 percent reduction.

In the second scheme, some solid carbon is added to the ore prior to pelletizing, thereby increasing the carbon-to-ore ratio while maintaining the binder-to-ore ratio at a level consistent with good pelletizing practice. This is used primarily for pre-reduction in the 50–80 percent range and, again heating to the calcining temperature should be rapid.

The third scheme differs from the second in that enough solid carbon is added to make high pre-reduction (+85 percent) possible. In this instance, heating to the calcining tempeature should be slow, to achieve desired desulfurization.

The fourth scheme can be visualized as combining the first or second schemes (i.e. relatively low reduction with fast heating) and a second reduction treatment including added carbon external to the pellets. It is to be understood that reduction by the use of internal carbon can be effected in a single reducer, with fast heating being effected when the internal carbon proves for no greater than 85 percent pre-reduction.

TABLE I

| Scheme | Carbon | Reduction Level, % Broad Range | Reduction Level, % Preferred Range | Heating Rate 1500° F to $T_F$ |
|---|---|---|---|---|
| I | Internal: all from petroleum resid binder | 20–70 | 35–50 | Fast |
| II | Internal: from petroleum resid binder plus solid carbon | 20–85 | 50–80 | Fast |
| III | Internal: from petroleum resid binder plus solid carbon | 85–100 | 90–100 | Slow |
| IV | Internal: all from petroleum resid binder, plus External: solid carbon | 40–100 | 50–100 | Fast |
| VA | Internal: all from highly carbonaceous binder such as coal tar pitch | 50–85 | 60–85 | Fast |
| VB | Internal: all from | | | |

TABLE I-continued

| Scheme | Carbon | Reduction Level, % Broad Range | Preferred Range | Heating Rate 1500° F to $T_r$ |
|---|---|---|---|---|
| | highly carbonaceous binder such as coal tar pitch | 85–100 | 90–100 | Slow |

As can be seen from Table 1, schemes I, II, IV, and VA require fast heating for proper desulfurization. Effective desulfurization is achieved by heating the pellets rapidly, in a period under one hour and preferably under 45 minutes, from a temperature of 1500° F to a final reduction temperature of 1800°–2500° F, preferably 1900°–2100° F.

For schemes III and VB (+85 percent reduction), effective desulfurization is achieved by maintaining a slow heating schedule, a period between one hour and six hours, preferably one and a half hours to three hours, from 1500° F to an upper temperature of 1800° to 2500° F, preferably 1900° to 2100° F.

After the pellets are heated to the final reduction temperature, the pellets are maintained at the final reduction temperature to achieve the prereduction. In general, such prereduction is achieved in a time from 15 minutes to 6 hours, preferably 30 minutes to 2 hours. As should be apparent, longer times can be used, and the selection of an optimum time is deemed to be within the scope of those skilled in the art from the teachings herein.

After reduction, the product pellets are cooled in a protective atmosphere, to prevent re-oxidation, as is conventional. However, it is advantageous to tumble the pellets during cooling, as this tends to close up the pores therein and increase the resistance of the pellets to weathering. Also, the cooling pellets may be tumbled with finely divided ore or limestone, both of which will tend to fill the pores (and both of which be preheated), with the same effect of increasing resistance to weathering.

Although the present invention is applicable to the production of prereduced iron oxide pellets in which prereduction is generally from 20 percent to 100 percent, in which the sulfur content of the prereduced pellet is no greater than 0.03 weight percent, the process is particularly suitable for producing a prereduced iron oxide pellet for an electric furnace wherein the reduction of the iron oxide pellet is greater than 85 percent, preferably 90 percent to 100 percent, and the sulfur content is no greater than 0.03 percent, by weight. As hereinabove described, the carbon for providing such prereduction can be provided totally by integral carbon, in which case heating from 1500° F up to the final reduction temperature is effected slowly, or by the use of integral carbon to provide less than 85 percent prereduction (rapid heating from 1500° F up to the final temperature), and external carbon to provide the additional reduction requirements to achieve a prereduction of greater than 85 percent, with the latter procedure being preferred. In providing pellets in this manner, the integral carbon is generally present to provide from 10 percent to 50 percent of prereduction, with the remainder of the prereduction being provided by external carbon. The procedure can be effected in two reduction stages, or in a single stage, with the pellets containing integral carbon and external carbon being both introduced into reducing apparatus to effect the prereduction. The external carbon is generally provided along with a suitable sulfur scavenger to prevent contamination of the pellets with any sulfur present in the external carbon. In accordance with the preferred operation, the pellets are preferably steamed during the coking, however, as hereinabove noted, a separate steaming step could be employed. In the production of the highly pre-reduced pellets, it is generally preferred not to effect steaming during the reduction in that the addition of steam may result in consumption of the external carbon. In the two stage process, the desulfurization is essentially completed in the first stage and, accordingly, it is possible to produce a desulfurized pellet pre-reduced to less than 85 percent (sulfur content no greater than 0.03 percent), which can be used for producing a highly pre-reduced pellet (greater than 85 percent) by reduction in the presence of external carbon.

The invention will be further described with respect to an embodiment thereof illustrated in the accompanying drawing wherein:

The drawing is a simplified schematic flow diagram of an embodiment of the present invention.

Referring to the drawing, iron oxide ore is combined with a desulfurizing additive, such as magnesium chloride, and preheated in zone 10. The preheated ore from zone 10 is introduced into a pelletizer 12 wherein carbonaceous liquid is added as a binder at non-cracking conditions to produce iron oxide pellets. The total amount of carbonaceous liquid added during the pelletizing step is adjusted to provide the desired amount of integral carbon for the subsequent reduction.

As an alternate procedure, a carbonizer 11 can be provided prior to the pelletizer to produce solid carbon and the ore-carbon mixture introduced into the pelletizer 12 whereby the solid carbon provides a portion of the integral carbon.

The pellets from pelletizer 12 aree introduced into coker 12 a to effect cooking thereof. In accordance with a preferred embodiment, steam is introduced into the coker to effect steaming of the pellets as hereinabove described.

As an alternative embodiment, the pellets from coker 12a can be introduced into a separate vessel 13 to effect steaming thereof and/or the pellets may be sprayed with water, in which case, subsequent heating of the pellets provides the required steam.

The coked pellets from coker 12a or vessel 13 are introduced into a reducer 14. In reducer 14, external carbon, including a sulfur scavenger, such as limestone may be introduced to provide a portion of the carbon requirements for the pre-reduction of the pellets. If the pellets have not been previously steamed, steam is introduced into reducer 14; however, as previously indicated, such as operation is not preferred.

As an alternative embodiment, the coked pellets may be introduced into a first stage reducer 15 wherein th pellets are desulfurized and pre-reduced to a degree consistent with the integral carbon content thereof. The pellets from the first stage reducer 15 may then be introduced into a second stage reducer 16 wherein the pellets can be further reduced by the addition of external carbon, preferably in combination with a sulfur scavenger.

duced from volatile matter) in all cases was less than 0.002 atm.

In all B run cases, the integral carbon present would provide less than 85 percent pre-reduction.

Runs 1 and 4 do not include steaming of the pellets and do not produce desulfurized pellets having a sulfur content of less than 0.03 weight percent.

| Run | Charge, Grams Pellets | Coke | Flux | Partial Pressure During Steaming Atm. Abs. | Temp. of Steaming, °F | Duration of Steaming, Hrs. | $T_1$° F | Heating Cycle Time to $T_F$, Hrs. | $T_F$, °F | Time at $T_F$, Hrs. | Sulfur in Finished Pellets, % | Residuum Binder Sulfur, % |
|---|---|---|---|---|---|---|---|---|---|---|---|---|
| 1. A | 150 | — | — | $CO_2$ - 0.2<br>$N_2$ - 0.8<br>$H_2O$ - None | — | — | 1050 | 0.42 | 1940 | 3 | 0.1/<br>0.14 | 3.5 |
| 2. A | 300 | — | — | $CO_2$ - 0.112<br>$N_2$ - —<br>$H_2O$ - 0.886 | 1040/1500 | 0.5 | 1040 | 0.5 | 2010 | 1.5 | 0.017 | 3.3 |
| 3. A | 454 | — | — | $CO_2$ - 0.101<br>$N_2$ - —<br>$H_2O$ - 0.899 | 1050 | 0.5 | 1050 | 0.5 | 2000 | 1.5 | 0.01 | 3.3 |
| 4. B | 300 | 300 | 20 (Limestone) | $CO_2$ - 0.5<br>$N_2$ - 0.5<br>$H_2O$ - None | — | — | 1070 | 0.5 | 1900 | 3 | 0.1/<br>0.18 | 3.5 |
| 5. B | 200 | 85 | 30 (Dolomite) | $CO_2$ - 0.014<br>$N_2$ - 0.067<br>$H_2O$ - 0.919 | 1000/1100 | 0.5 | 1100 | 0.42 | 1930 | 2.0 | 0.024 | 3.5 |
| 6. B | 200 | 85 | 15 (Limestone) | $CO_2$ - 0.015<br>$N_2$ - 0.076<br>$H_2O$ - 0.909 | 1000/1100 | 0.6 | 1100 | 0.6 | 1960 | 2.0 | 0.018 | 3.5 |
| 7. B | 200 | 100 | 40 (Limestone) | $CO_2$ - 0.013<br>$N_2$ - 0.064<br>$H_2O$ - 0.923 | 1000/1100 | 0.5 | 1100 | 0.75 | 1990 | 2.0 | 0.028 | 5.5 |
| 8. B | 400 | 280 | 44 (Limestone) | $CO_2$ - 0.015<br>$N_2$ - 0.074<br>$H_2O$ - 0.911 | 900/1050 | 0.6 | 1050 | 0.7 | 1930 | 2.0 | 0.01 | 3.3 |
| 9. B | 370 | 255 | 40 (Limestone) | $CO_2$ - 0.023<br>$N_2$ - 0.114<br>$H_2O$ - 0.863 | 1000/1100 | 0.75 | 1100 | 0.6 | 1930 | 2.0 | 0.01 | 3.3 |
| 10. B | 200 | 100 | 40 (Dolomite) | $CO_2$ - 0.020<br>$N_2$ - 0.103<br>$H_2O$ - 0.877 | 950/1100 | 0.75 | 1100 | 0.6 | 1990 | 2.0 | 0.016 | 5.5 |

It is to be understood that if prior steaming has not been effected, steam is introduced into the first stage reducer 15.

It is to be understood that the hereinabove description with respect to the schematic flow diagram is only illustrative and, accordingly, the scope of the invention is not to be limited thereby.

The invention will be further described with respect to the following examples. Unless otherwise indicated, parts and percentages are by weight.

EXAMPLE

Iron oxide pellets having integral carbon, prepared from a sulfur containing resid, subsequent to the coking, are introduced into a linder furnace, without prior steaming.

In the "A" runs, no external carbon is present, and in the "B" runs an external burden of coke and sulfur scavenger, as indicated, is provided. In the A runs, pre-reduction is in the order of 35–40 percent; and in the B runs the internal carbon provides in the order of 35–40 percent pre-reduction, with the presence of external carbon providing a pellet with at least 98 percent pre-reduction.

In runs 1, 2, 3 and 4 the coked pellets contain 2 weight percent $CaCl_2$; in runs 5, 6, 8 and 9, 1.4 weight percent $MgCl_2$; and in runs 7 and 10, 2.3 weight percent $MgCl_2$, all based on ore.

The indicated partial pressures are on a hydrocarbon free basis in that the hydrocarbon partial pressure (pro- The temperatures of the heating cycle are furnace temperatures, and the pellet temperature is about 100° F less than the furnace temperature when heating to $T_F$, while more closely approaching the furnace temperature to within less than 25° F during the indicated residence time at $T_F$.

The present invention is particularly advantageous in that it is possible to produce pre-reduced pellets having a sulfur content of no greater than 0.03 weight percent, even when using carbonaceous liquid, to provide integral carbon, having sulfur contents up to 5.5 percent. The advantageous results of the present invention are achieved by the combination of heating the pellets up to the reducing temperature in the prescribed time periods; steaming; and including a desulfurizing additive in the pellets, as hereinabove described. The selection of the particular desulfurizing additive and steam atmosphere for providing a pre-reduced pellet having a sulfur content of no greater than 0.03 weight percent can be readily selected by those skilled in the art from the teachings herein.

Numerous modifications and variations of the present invention are possible in light of the above teachings and, therefore, within the scope of the appended claims, the invention may be practiced otherwise than as particularly described.

What is claimed is:

1. A process for producing prereduced iron oxide pellets fron an iron oxide pellet containing a desulfurizing amount of a desulfurizing additive and integral carbon, at least a portion of which was produced from a sulfur containing carbonaceous material, comprising:
heating said iron oxide pellets containing said desulfurizing additive and integral carbon in an amount sufficient to effect from 20 percent to 85 percent prereduction of the iron oxide pellets to raise the temperature of the iron oxide pellets to a final reduction temperature of from 1800° F to 2500° F, during said heating the temperature of the pellets being raised from 1500° F to a temperature of from 1800° F to 2500° F in a time of less than 1 hour; and
steaming said iron oxide pellets for a period of at least 0.25 hour in an atmosphere having a steam partial pressure of at least 0.04 atm. and maintaining the iron oxide pellets at the reduction temperature and provide a prereduced iron oxide pellet having a sulfur content of no greater than 0.03 weight percent, said steaming being effected prior to completion of the reduction.

2. The process of claim 1 wherein the pellets are steamed prior to heating said iron oxide pellets to the final reduction temperature.

3. The process of claim 2 wherein said steaming is effected in an atmosphere having a steam partial pressure from 0.04 atm. to 1 atm.

4. The process of claim 2 wherein the desulfurizing additive comprises at least one member selected from the group consisting of magnesium chloride, calcium chloride, ferrous chloride, ferric chloride, a mixture of sodium chloride and sodium carbonate and a mixture of sodium chloride and calcium oxide.

5. The process of claim 4 wherein the desulfurizing additive is present in an amount from 0.01 percent to 5 percent, by weight, based on iron oxide.

6. The process of claim 5 wherein the final reduction temperature is from 1900° F. to 2100° F., and the temperature of the pellets is raised to a final reduction temperature in a time less than three-fourths of an hour.

7. The process of claim 5 wherein the final reduction is effected in the presence of external carbon in an amount to produce a pellet with greater than 85 percent prereduction.

8. The process of claim 1 wherein the pellets are steamed during the prereduction.

9. A process for producing prereduced iron oxide pellets of low sulfur content, comprising:
pelletizing iron oxide ore and a desulfurizing amount of a desulfurizing additive comprising at least one member selected from the group consisting of magnesium chloride, calcium chloride, ferrous chloride, ferric chloride, a mixture of sodium chloride and calcium carbonate and a mixture of sodium chloride and calcium oxide, with a sulfur bearing liquid carbonaceous material, said pellets containing carbonaceous material in an amount to provide integral carbon for effecting 20 to 85 percent prereduction, at least a portion of which is provided by the sulfur bearing liquid carbonaceous material;
coking the pellets and steaming the pellets during said coking in an atmosphere having a steam partial pressure of at least 0.04 atm. for a time of at least 0.25 hour;
recovering coked pellets having integral carbon to provide from 20 to 85 percent prereduction of the iron oxide ore;
heating the coked iron oxide pellets to raise the temperature of the pellets to a final reduction temperature of from 1800° F to 2500° F, during said heating the temperature of the pellets being raised from 1500° F to a temperature of from 1800° F to 2500° F in a time of less than 1 hour; and
prereducing the pellets by maintaining the iron oxide pellets at the final reduction temperature to produce prereduced iron oxide pellets having a sulfur content of no greater than 0.03 weight percent.

10. The process of claim 9 wherein the pellets contain integral carbon in an amount to provide from 20 percent to 70 percent prereduction.

11. The process of claim 10 wherein the prereducing is effected in the presence of external carbon to produce a prereduced pellet of 90 percent to 100 percent prereduction.

12. The process of claim 11 wherein the prereduction is effected in a single stage.

13. The process of claim 11 wherein the prereduction is effected in two stages, the first stage prereduction being effected with the integral carbon present in the pellets and the second stage prereduction being effected in the presence of the external carbon to provide the prereduced pellets of 90 percent to 100 percent prereduction.

14. The process of claim 10 wherein the heating from 1500° F. to a temperature of 1800° F. to 2500° F. is effected in a time of less than ¾ hour.

15. The process of claim 10 wherein the desulfurizing additive is present in an amount of 0.01 percent to 5 percent, by weight, based on iron oxide ore.

16. A process for producing prereduced iron oxide pellets from an iron oxide pellet containing a desulfurizing amount of a desulfurizing additive, and integral carbon in an amount to provide greater than 85 percent prereduction, at least a portion of which was produced from a sulfur containing carbonaceous material, comprising:
heating the iron oxide pellet containing the desulfurizing additive and the integral carbon to raise the temperature of the pellets to a final reduction temperature of from 1800° F to 2500° F, during said heating the temperature of the pellets being raised from 1500° F to a temperature of from 1800° F to 2500° F in a time of from 1 to 6 hours;
steaming said iron oxide pellets for a period of at least 0.25 hour in an atmosphere having a steam partial pressure of at least 0.04 atm. and maintaining the iron oxide pellets at the final reduction temperature to provide a prereduced iron oxide pellet of greater than 85 percent prereduction having a sulfur content of no greater than 0.03 weight percent, said steaming being effected prior to completion of the reduction.

17. The process of claim 16 wherein the pellets are steamed prior to heating said iron oxide pellets to the final reduction temperature.

18. The process of claim 17 wherein said steaming is effected in an atmosphere having a steam partial pressure from 0.04 atm. to 1 atm.

19. The process of claim 17 wherein the desulfurizing additive compound comprises at least one member selected from the group consisting of magnesium chloride, calcium chloride, ferrous chloride, ferric chloride, a mixture of sodium chloride and sodium carbonate and a mixture of sodium chloride and calcium oxide.

20. The process of claim 19 wherein the desulfurizing additive is present in an amount from 0.01 percent to 5 percent, by weight, based on iron oxide.

21. The process of claim 20 wherein the final reduction temperature is from 1900° F. to 2100° F., and the temperature of the pellets is raised to a final reduction temperature in a time of 1.5 to 3 hours.

22. The process of claim 20 wherein the pellets contain integral carbon in an amount to provide 90 percent to 100 percent prereduction.

23. The process of claim 16 wherein the pellets are steamed during the prereduction.

24. A process for producing prereduced iron oxide pellets of low sulfur content, comprising:

pelletizing iron oxide ore and a desulfurizing amount of a desulfurizing additive comprising at least one member selected from the group consisting of magnesium chloride, calcium chloride, ferrous chloride, ferric chloride, a mixture of sodium chloride and calcium carbonate and a mixture of sodium chloride and calcium oxide, with a sulfur bearing liquid carbonaceous material, said pellets containing carbonaceous material in an amount to provide integral carbon for effecting 90–100 percent prereduction at least a portion of which is provided by the sulfur bearing liquid carbonaceous material;

coking the pellets and steaming the pellets during said coking in an atmosphere having a steam partial pressure of at least 0.04 atm. for a time of at least 0.25 hour;

recovering coked pellets having integral carbon to provide from 80–90 percent prereduction of the iron oxide ore;

heating the coked iron oxide pellets to raise the temperature of the pellets to a final reduction temperature of from 1800° F to 2500° F, during said heating the temperature of the pellets being raised from 1500° F to a temperature of from 1800° F to 2500° F in a time of 1 hour to 6 hours; and prereducing the pellets by maintaining the iron oxide pellets at the final reduction temperature to produce prereduced iron oxide pellets having a sulfur content of no greater than 0.03 weight percent and a prereduction of 90 percent to 100 percent.

25. The process of claim 24 wherein the desulfurizing additive is present in an amount from 0.01 percent to 5 percent, by weight, based on iron oxide ore.

26. The process of claim 24 wherein at least a portion of the steam for the steaming is provided by moisture in the pellets.

* * * * *

UNITED STATES PATENT OFFICE
CERTIFICATE OF CORRECTION

Patent No. 3,993,472  Dated November 23, 1976

Inventor(s) Raymond H. Long and William V. Bauer

It is certified that error appears in the above-identified patent and that said Letters Patent are hereby corrected as shown below:

In the Specification:

Col. 1, line 59, "dsulfurization" should be --desulfurization--;

Col. 4, line 9, "heat" should be --heating--;

line 38, correct "tempeature" to --temperature--;

Col. 5, line 40, after "which" insert --will--;

Col. 6, line 49, "aree" should be --are--

UNITED STATES PATENT OFFICE
CERTIFICATE OF CORRECTION

Patent No. 3,993,472      Dated November 23, 1976

Inventor(s) Raymond H. Long et al.

It is certified that error appears in the above-identified patent and that said Letters Patent are hereby corrected as shown below:

Column 6, lines 49 - 68 should read

-- The pellets from pelletizer 12 are introduced into coker 12a to effect coking thereof. In accordance with a preferred embodiment, steam is introduced into the coker to effect steaming of the pellets as hereinabove described.

As an alternative embodiment, the pellets from coker 12a can be introduced into a separate vessel 13 to effect steaming thereof and/or the pellets may be sprayed with water, in which case, subsequent heating of the pellets provides the required steam.

The coked pellets from coker 12a or vessel 13 are introduced into a reducer 14. In reducer 14, external carbon, including a sulfur scavenger, such as limestone, may be introduced to provide a portion of the carbon requirements for the pre-reduction of the pellets. If the pellets have not been previously steamed, steam is introduced into reducer 14; however, as previously indicated, such as operation is not preferred.

As an alternative embodiment, the coked pellets may be introduced into a first stage reducer 15 wherein the --.

Signed and Sealed this twenty-third Day of August 1977

[SEAL]

Attest:

RUTH C. MASON
*Attesting Officer*

C. MARSHALL DANN
*Commissioner of Patents and Trademarks*